(12) United States Patent
Mohite et al.

(10) Patent No.: US 12,340,516 B2
(45) Date of Patent: Jun. 24, 2025

(54) METHOD AND SYSTEM FOR DETECTION OF FIELD BOUNDARIES USING COARSE RESOLUTION SATELLITE DATA AND GIS

(71) Applicant: Tata Consultancy Services Limited, Mumbai (IN)

(72) Inventors: Jayantrao Mohite, Thane (IN); Suryakant Ashok Sawant, Thane (IN); Rishabh Agarwal, Thane (IN); Ankur Pandit, Thane (IN); Srinivasu Pappula, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 202 days.

(21) Appl. No.: 18/175,158

(22) Filed: Feb. 27, 2023

(65) Prior Publication Data

US 2023/0298183 A1 Sep. 21, 2023

(30) Foreign Application Priority Data

Mar. 15, 2022 (IN) .............................. 202221013927

(51) Int. Cl.
*G06T 7/13* (2017.01)
*G06T 5/20* (2006.01)
(Continued)

(52) U.S. Cl.
CPC ................. *G06T 7/13* (2017.01); *G06T 5/20* (2013.01); *G06T 5/50* (2013.01); *G06T 7/12* (2017.01);
(Continued)

(58) Field of Classification Search
CPC .... G06T 7/13; G06T 5/20; G06T 5/50; G06T 7/12; G06T 2207/20221; G06V 10/25;
(Continued)

(56) References Cited

U.S. PATENT DOCUMENTS 11,164,310 B2 11/2021 Albrecht et al.
2015/0371161 A1* 12/2015 Mueller ............... G06Q 30/018
705/7.12

(Continued)

OTHER PUBLICATIONS

Teng, J., Wang, F., & Liu, Y. (2008). An Efficient Algorithm for Raster-to-Vector Data Conversion. Geographic Information Sciences, 14(1), 54â62 (Year: 2008).*

(Continued)

*Primary Examiner* — Amandeep Saini
*Assistant Examiner* — Emma Rose Goebel
(74) *Attorney, Agent, or Firm* — Finnegan, Henderson, Farabow, Garrett & Dunner, LLP

(57) ABSTRACT

Coarse resolution satellite data has limited information content of land captured in the images and small area field boundary detection is technically challenging. Embodiments of the present disclosure provide a method and system for detection of field boundaries using coarse resolution satellite data and GIS. Multi-layer crop segmentation approach is used over RoI, wherein agricultural land related segments are derived from a soil layer, a temporal stack for a current season and a temporal change layer from the coarse resolution satellite data of the RoI. Segmentation based on different aspects captures various details at each segmentation layer. The segments are then combined, which aggregates all information related to the land to accurately detect the field boundaries in the RoI. The field boundaries are further refined using GIS topology operations. Baseline cadastral maps are updated using information from maps generated using refined field boundaries identified in real time for each season.

6 Claims, 2 Drawing Sheets

(51) Int. Cl.
  *G06T 5/50* (2006.01)
  *G06T 7/12* (2017.01)
  *G06V 10/25* (2022.01)
  *G06V 20/10* (2022.01)
  *G06V 20/13* (2022.01)

(52) U.S. Cl.
  CPC .............. *G06V 10/25* (2022.01); *G06V 20/13* (2022.01); *G06V 20/188* (2022.01); *G06T 2207/20221* (2013.01); *G06V 2201/07* (2022.01)

(58) Field of Classification Search
  CPC ................ G06V 20/13; G06V 20/188; G06V 2201/07; G06V 10/22; G06V 10/454; G06V 10/58; G06V 10/62; G06V 10/74; G06V 10/80; G06V 10/82; G06V 20/52; G06V 20/70; G06V 20/194; G06Q 50/02
  See application file for complete search history.

(56) References Cited

U.S. PATENT DOCUMENTS

| | | | | |
|---|---|---|---|---|
| 2018/0373932 | A1* | 12/2018 | Albrecht | G06V 20/188 |
| 2021/0342586 | A1* | 11/2021 | Fleisig | G06V 10/457 |
| 2022/0019794 | A1* | 1/2022 | Logie | G06V 20/13 |
| 2022/0092306 | A1* | 3/2022 | Tian | G06F 18/24323 |

OTHER PUBLICATIONS

Mohammed, Issamaldin Mohammed Alshiekh, "Mapping Crop Field Probabilities Using Hyper Temporal and Multi Spatial Remote Sensing in a Fragmented Landscape of Ethiopia", Student Thesis, Date: Feb. 2019, Publisher: University of Twente, http://essay.utwente.nl/85884/1/mohammed.pdf.

Marshall, Michael et al., "Crowd-Driven and Automated Mapping of Field Boundaries in Highly Fragmented Agricultural Landscapes of Ethiopia with Very High Spatial Resolution Imagery", Remote Sensing, Date: Sep. 2019, vol. 11(18), Publisher: MDPI, https:/www.mdpi.com/2072-4292/11/18/2082.

Zhang, Huanxue, et al., "Automated delineation of agricultural field boundaries from Sentinel-2 images using recurrent residual U-Net", International Journal of Applied Earth Observation and Geoinformation, Date: Nov. 2021, vol. 105, Publisher: Elsevier, https://reader.elsevier.com/reader/sd/pii/S0303243421002646?token=3DSEEDA19594F40E739FFDFE3902A1478808DB2B6FD7FBC3C66F86383DD585016980233C925BD28CB18C03E845829789&originRegion=eu-west-1&originCreation20230213095152.

North, Heather C. et al., "Boundary Delineation of Agricultural Fields in Multitemporal Satellite Imagery", IEEE Journal of Selected Topics in Applied Earth Observations and Remote Sensing, Date: Dec. 2018, vol. 12, Issue: 1, pp. 237-251, Publisher: IEEE, https://ieeexplore.ieee.org/stamp/stamp.jsp?arnumber=8584043.

Kumar, V. V. Govind et al., "Updation of Cadastral Maps Using High Resolution Remotely Sensed Data", Environmental Science, Mathematics, Date: Apr. 2013, Publisher: Semantic Scholar, https://www.ijeat.org/wp-content/uploads/papers/v2i4/D1275042413.pdf.

* cited by examiner

200

```
┌─────────────────────────────────────────────────┐
│ receiving for a RoI coarse resolution satellite │
│ data captured at a plurality of time stamps the │ ─ 202
│ coarse resolution satellite data comprising:    │
│ (i) a plurality of current season images and    │
│ a plurality of previous seasons images          │
│ collected for a predefined number of previous   │
│ seasons                                         │
└─────────────────────────────────────────────────┘
                         ▼
┌─────────────────────────────────────────────────┐
│ masking each of the plurality of current season │
│ images and each of the plurality of previous    │ ─ 204
│ seasons images using an agriculture versus      │
│ non-agriculture layer data to generate a        │
│ plurality filtered current season images and a  │
│ plurality of filtered previous seasons images   │
└─────────────────────────────────────────────────┘
                         ▼
┌─────────────────────────────────────────────────┐
│ performing a multi-layer crop segmentation      │
│ selectively on the plurality filtered current   │
│ season images and the plurality of filtered     │ ─ 206
│ previous seasons images, multi-layer crop       │
│ segmentation comprising a soil-based            │
│ segmentation, a crop-wise segmentation, and a   │
│ within-crop segmentation                        │
└─────────────────────────────────────────────────┘
                         ▼
┌─────────────────────────────────────────────────┐
│ detecting the field boundaries of the           │
│ agricultural area within the RoI by combining   │ ─ 208
│ the soil based segmented images, the crop-wise  │
│ segmented images, and the within-crop segmented │
│ images                                          │
└─────────────────────────────────────────────────┘
                         ▼
┌─────────────────────────────────────────────────┐
│ refining the field boundaries are refined using │ ─ 210
│ Geographic Information System (GIS) topology    │
│ operations                                      │
└─────────────────────────────────────────────────┘
                         ▼
┌─────────────────────────────────────────────────┐
│ updating baseline cadastral maps using          │ ─ 212
│ information from maps generated using the       │
│ refined field boundaries identified in real     │
│ time for each season                            │
└─────────────────────────────────────────────────┘
```

FIG. 2

METHOD AND SYSTEM FOR DETECTION OF FIELD BOUNDARIES USING COARSE RESOLUTION SATELLITE DATA AND GIS

PRIORITY CLAIM

This U.S. patent application claims priority under 35 U.S.C. § 119 to: Indian Patent Application No. 202221013927, filed on 15 Mar. 2022. The entire contents of the aforementioned application are incorporated herein by reference.

TECHNICAL FIELD

The embodiments herein generally relate to processing of satellite images and, more particularly, to a method and system for detection of field boundaries using coarse resolution satellite data and Geographic Information System (GIS).

BACKGROUND

The agriculture field boundaries data would be useful to provide personalized services to cultivators and can be also used by insurance companies, banks, and any other interested party to remotely track crop growth progress. However, the data on such agriculture field boundaries is not available with anyone. Cadastral surveys of the agriculture field boundaries have been carried out long ago and there are hardly any updates made in cadastral maps. Hence the cadastral maps alone are not useful as land ownership have changed over years with more fragmentation of the original land and have not been updated. Manually updating the cadastral maps every year at field level is extremely difficult and is a time consuming effort.

Satellite imagery has been a critical player in land analysis and can be used for agriculture field boundary detection. However, for applications such as field boundary detection high quality or high resolution data is required considering the accuracy required in detection of boundaries, specifically when boundaries are of very small size. High resolution satellite images consume high volume of resources of the end processing systems as the high volume of data demands more processing, more memory, and more time. Further, cost of acquiring high resolution satellite images is high. Attempts to use coarse resolution satellite data for field boundary detection have been restricted to detecting large size agriculture field boundaries (>2 hectares (ha), 1 hectare-10000 square meters). The reason being obvious, the coarse resolution data carries lesser land information in the images. Moreover, the course resolution satellite data alone is not enough to get accurate results on detection of exact edges of the agriculture field boundaries. Thus, utilizing course resolution satellite data for small field boundary detection is an open technical challenge.

SUMMARY

Embodiments of the present disclosure present technological improvements as solutions to one or more of the above-mentioned technical problems recognized by the inventors in conventional systems.

For example, in one embodiment, a method for detection of field boundaries is provided. The method includes receiving for a Region of Interest (RoI), a coarse resolution satellite data captured at a plurality of time stamps the coarse resolution satellite data comprising: (i) a plurality of current season images, and (ii) a plurality of previous seasons images collected for a predefined number of previous seasons. Further, the method includes masking, each of the plurality of current season images and each of the plurality of previous seasons images using an agriculture versus non-agriculture layer data to generate a plurality of filtered current season images and a plurality of filtered previous seasons images, wherein a pixel information in each image is restricted to an agricultural area of the RoI. Further, the method includes performing a multi-layer crop segmentation selectively on the plurality filtered current season images and the plurality of filtered previous seasons images, the multi-layer crop segmentation comprising (a) a soil-based segmentation capturing spectral features of the RoI, (b) a crop-wise segmentation capturing spatial features of the RoI in context of field boundary detection, and (c) a within-crop segmentation capturing semantic information of the RoI. The soil-based segmentation is performed on each the plurality filtered current season images identifying a plurality of soil-based field edges, based on segmentation of bands and indices associated with the coarse resolution satellite data, to generate a plurality of soil-based segmented images. The crop-wise segmentation is performed on a first set of images identified from the plurality filtered current season images corresponding to a crop growing season, wherein the crop-wise segmentation comprising: estimating a coherence between consecutive images in the first set of images to generate a temporal stack of coherence images; deriving a Normalized Difference Vegetation Index (NDVI), during crop growing season from the first set of images to generate a temporal stack of NDVI; and performing crop-wise segmentation of the set of images using the temporal stack of coherence images and the temporal stack of NDVI, to generate crop-wise segmented images. The within-crop segmentation is performed on the plurality of filtered previous seasons images, the within-crop segmentation comprising: identifying one or more crops corresponding to each pixel of the plurality of filtered previous seasons images to generate a pixel level crop information; identifying a second set of images from among the plurality of filtered previous seasons images using pixel level crop information, wherein a crop across the second set of images is similar; and estimating, a median NDVI for the filtered previous seasons images, and comparing with the NDVI associated with first set of images at same time slots across in a crop season, to generate a temporal stack of change layer is generated, where further the segmentation is carried out on the temporal stack of change layer to generate within-crop segmented images.

Furthermore, the method includes detecting the field boundaries of the agricultural area within the RoI by combining the soil-based segmented images, the crop-wise segmented images, and the within-crop segmented images. Further, the method includes refining the field boundaries using a plurality of Geographic Information System (GIS) topology operations. Furthermore, the method includes updating a plurality of baseline cadastral maps using information from maps generated using the refined field boundaries identified in real time for each season.

In another aspect, a system for detection of field boundaries is provided. The system comprises a memory storing instructions; one or more Input/Output (I/O) interfaces; and one or more hardware processors coupled to the memory via the one or more I/O interfaces, wherein the one or more hardware processors are configured by the instructions to receive for a Region of Interest (RoI), a coarse resolution satellite data captured at a plurality of time stamps the coarse resolution satellite data comprising: (i) a plurality of current season images, and (ii) a plurality of previous seasons images collected for a predefined number of previous seasons. Further, the one or more hardware processors are configured to mask each of the plurality of current season images and each of the plurality of previous seasons images using an agriculture versus non-agriculture layer data to generate a plurality of filtered current season images and a plurality of filtered previous seasons images, wherein a pixel information in each image is restricted to an agricultural area of the RoI. Further, the one or more hardware processors are configured to perform a multi-layer crop segmentation selectively on the plurality filtered current season images and the plurality of filtered previous seasons images, the multi-layer crop segmentation comprising (a) a soil-based segmentation capturing spectral features of the RoI, (b) a crop-wise segmentation capturing spatial features of the RoI in context of field boundary detection, and (c) a within-crop segmentation capturing semantic information of the RoI. The soil-based segmentation is performed on each the plurality filtered current season images identifying a plurality of soil-based field edges, based on segmentation of bands and indices associated with the coarse resolution satellite data, to generate a plurality of soil-based segmented images. The crop-wise segmentation is performed on a first set of images identified from the plurality filtered current season images corresponding to a crop growing season, wherein the crop-wise segmentation comprising: estimating a coherence between consecutive images in the first set of images to generate a temporal stack of coherence images; deriving a Normalized Difference Vegetation Index (NDVI), during crop growing season from the first set of images to generate a temporal stack of NDVI; and performing crop-wise segmentation of the set of images using the temporal stack of coherence images and the temporal stack of NDVI, to generate crop-wise segmented images. The within-crop segmentation is performed on the plurality of filtered previous seasons images, the within-crop segmentation comprising: identifying one or more crops corresponding to each pixel of the plurality of filtered previous seasons images to generate a pixel level crop information; identifying a second set of images from among the plurality of filtered previous seasons images using pixel level crop information, wherein a crop across the second set of images is similar; and estimating, a median NDVI for the filtered previous seasons images, and comparing with the NDVI associated with first set of images at same time slots across in a crop season, to generate a temporal stack of change layer is generated, where further the segmentation is carried out on the temporal stack of change layer to generate within-crop segmented images.

Furthermore, the one or more hardware processors are configured to detect the field boundaries of the agricultural area within the RoI by combining the soil-based segmented images, the crop-wise segmented images, and the within-crop segmented images. Further, the method includes refining the field boundaries using a plurality of Geographic Information System (GIS) topology operations. Furthermore, the one or more hardware processors are configured to update a plurality of baseline cadastral maps using information from maps generated using the refined field boundaries identified in real time for each season.

In yet another aspect, there are provided one or more non-transitory machine-readable information storage mediums comprising one or more instructions, which when executed by one or more hardware processors causes a method for detection of field boundaries. The method includes receiving for a Region of Interest (RoI), a coarse resolution satellite data captured at a plurality of time stamps the coarse resolution satellite data comprising: (i) a plurality of current season images, and (ii) a plurality of previous seasons images collected for a predefined number of previous seasons. Further, the method includes masking, each of the plurality of current season images and each of the plurality of previous seasons images using an agriculture versus non-agriculture layer data to generate a plurality of filtered current season images and a plurality of filtered previous seasons images, wherein a pixel information in each image is restricted to an agricultural area of the RoI. Further, the method includes performing a multi-layer crop segmentation selectively on the plurality filtered current season images and the plurality of filtered previous seasons images, the multi-layer crop segmentation comprising (a) a soil-based segmentation capturing spectral features of the RoI, (b) a crop-wise segmentation capturing spatial features of the RoI in context of field boundary detection, and (c) a within-crop segmentation capturing semantic information of the RoI. The soil-based segmentation is performed on each the plurality filtered current season images identifying a plurality of soil-based field edges, based on segmentation of bands and indices associated with the coarse resolution satellite data, to generate a plurality of soil-based segmented images. The crop-wise segmentation is performed on a first set of images identified from the plurality filtered current season images corresponding to a crop growing season, wherein the crop-wise segmentation comprising: estimating a coherence between consecutive images in the first set of images to generate a temporal stack of coherence images; deriving a Normalized Difference Vegetation Index (NDVI), during crop growing season from the first set of images to generate a temporal stack of NDVI; and performing crop-wise segmentation of the set of images using the temporal stack of coherence images and the temporal stack of NDVI, to generate crop-wise segmented images. The within-crop segmentation is performed on the plurality of filtered previous seasons images, the within-crop segmentation comprising: identifying one or more crops corresponding to each pixel of the plurality of filtered previous seasons images to generate a pixel level crop information; identifying a second set of images from among the plurality of filtered previous seasons images using pixel level crop information, wherein a crop across the second set of images is similar; and estimating, a median NDVI for the filtered previous seasons images, and comparing with the NDVI associated with first set of images at same time slots across in a crop season, to generate a temporal stack of change layer is generated, where further the segmentation is carried out on the temporal stack of change layer to generate within-crop segmented images.

Furthermore, the method includes detecting the field boundaries of the agricultural area within the RoI by combining the soil-based segmented images, the crop-wise segmented images, and the within-crop segmented images. Further, the method includes refining the field boundaries using a plurality of Geographic Information System (GIS) topology operations. Furthermore, the method includes updating a plurality of baseline cadastral maps using information from maps generated using the refined field boundaries identified in real time for each season.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flow diagram illustrating a method for detection of field boundaries using coarse resolution satellite data and Geographic Information System (GIS), using the system of FIG. 1, in accordance with some embodiments of the present disclosure.

Figure 1:
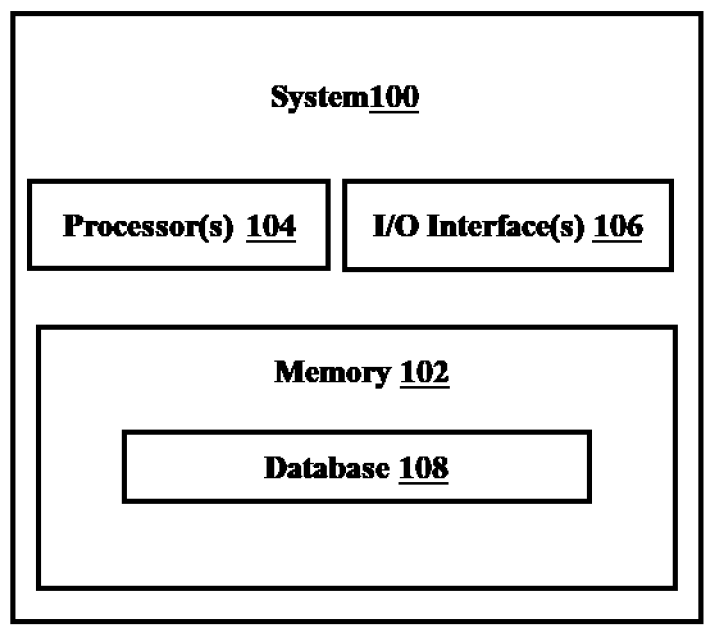
FIG. 1 is a functional block diagram of a system for detection of field boundaries using coarse resolution satellite data and Geographic Information System (GIS), in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As understood, acquiring and processing of high resolution satellite data has its own challenges. Coarse resolution satellite data has limited information content of land captured in the images. Thus, usage of coarse resolution satellite data for small area field boundary detection is technically challenging.

Embodiments of the present disclosure provide a method and system for detection of field boundaries using coarse resolution satellite data and Geographic Information System (GIS). Due to limitation of details captured in coarse resolution satellite data, existing field boundary detection based on coarse resolution satellite data can detect only larger size agriculture field boundaries (>2 hectares (ha), 1 hectare-10000 square meters). Existing approaches of simply using Normalized Difference Vegetation Index (NDVI) based segmentation on coarse resolution images will not work for detection very small field boundaries. Further, single season image may not be only useful as the field boundaries in the areas with homogeneous cropping pattern may be separable.

However, the method disclosed herein enables detection of field boundaries which are smaller in size (<1 ha) using the coarse resolution satellite data. The method utilizes a multi-layer crop segmentation approach for detection of field boundaries. For a Region of Interest (RoI), agricultural land related segments are derived from a soil layer, a temporal stack for a current season and a temporal change layer from the coarse resolution satellite data of the RoI. Thus, details required for field boundary detection are derived at various levels using multiple level segmentation based on different aspects. The segments so obtained are combined, which aggregate spectral, spatial, and semantic information related to the land, to accurately detect the small field boundaries in the RoI from only the coarse resolution satellite data. This combined segments provide an intermediate raster output which is cleaned using GIS topology operations. Thus, the output edge raster images are converted into vector polygon geometry. Topology operations such as sliver polygon removal, overshoot and undershoot error removal, excess node removal/boundary smoothing are applied to refine the field boundary output.

The combinational approach of the method disclosed herein provides long terms solution by using coarse resolution satellite data, as its always not feasible to invest in purchasing high resolution data. Further, integration of GIS to field boundary output of multi-layer segmentation enables precise delineation (correction) in all possible scenarios, even when satellite derived outputs from multi segmentation are not so accurate due to coarse data.

Further, baseline cadastral maps are updated using information from maps generated using the refined field boundaries identified in real time for each season. Thus, the system enables delineating the field boundaries without visiting the fields and with very minimal cost.

Referring now to the drawings, and more particularly to FIGS. 1 through 2, where similar reference characters denote corresponding features consistently throughout the figures, there are shown preferred embodiments and these embodiments are described in the context of the following exemplary system and/or method.

FIG. 1 is a functional block diagram of a system 100 for detection of field boundaries using coarse resolution satellite data and Geographic Information System (GIS), in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like. The system 100, such as a handheld device or mobile phone is equipped with sensing, processing, communicating and storage capability. The system 100 is also enabled with Global Positioning System (GPS) to capture a few geotagged points from field boundaries of selected fields during training data collection process for training Machine Learning (ML) models for segmentation of acquired coarse resolution satellite images.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another servers or devices. The servers are used to process requests and send responses, to execute algorithm for training and detection image segments for various segmentation approaches used in the multi-layer crop segmentation disclosed herein for small field boundary detection.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a plurality of modules. Further, the memory 102 includes a database 108 database to store intermediate raster/edge outputs, final vector field boundaries/outputs, a Convolutional Neural Network (CNN) based trained Machine Learning (ML) model (not shown) and the like. The CNN based ML model has multiple segmentation layers such as a soil-based segmentation layer, a crop-based segmentation layer, and a within crop segmentation layer used for segmentation at various levels. The ML model is pretrained using temporal and historical coarse resolution satellite data. Further the database 108 stores all acquired data such as time series remote sensing data, coarse resolution satellite data, optical as well Synthetic Aperture Radar (SAR) data and the like. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of the system 100 are explained in conjunction with flow diagram of FIG. 2.

FIG. 2 is a flow diagram illustrating a method 200 for detection of field boundaries using coarse resolution satellite data and Geographic Information System (GIS), using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202 of the method 200, the one or more hardware processors 104 receive for a Region of Interest (RoI), a coarse resolution satellite data captured at a plurality of time stamps, the coarse resolution satellite data comprising: (i) a plurality of current season images, and (ii) a plurality of previous seasons images collected for a predefined number of previous seasons. For any region, the coarse resolution satellite data such as Sentinel-2, Sentinel-1, Landsat-8 etc. are used.

Since the images from the coarse resolution satellite data capture the entire land image of the RoI, while land of interest corresponds to only the agricultural land for which the field boundaries are to be detected, the method demarcates the non-agricultural areas from the images captured for the RoI. This enables reduction of unwanted pixel processing corresponding to non-agricultural land areas. Thus, the at step 204 of the method 200, the one or more hardware processors 104 mask each of the plurality of current season images and each of the plurality of previous seasons images using an agriculture versus non-agriculture layer data to generate a plurality filtered current season images and a plurality of filtered previous seasons images, wherein pixel information in each image is restricted to an agricultural area of the RoI. Data on agriculture vs non-agriculture layer can be obtained from openly available land-cover layers.

At step 206 of the method 200, the one or more hardware processors 104 perform a multi-layer crop segmentation selectively on the plurality filtered current season images and the plurality of filtered previous seasons images. The multi-layer crop segmentation comprises (a) a soil-based segmentation capturing spectral features of the agricultural land RoI in context of field boundary detection from the coarse resolution satellite data, (b) a crop-wise segmentation capturing spatial features of the agricultural land in the RoI in context of field boundary detection, and (c) a within-crop segmentation capturing semantic information of the agricultural land in the RoI in context of field boundary detection as explained below. These varied details are captured using segmentation performed at different levels with different data interest. The information so extracted is then combined to get field boundaries even from coarse resolution satellite data. Various segmentations techniques known on the art can be used. In an example implementation the method disclosed utilizes CNN based ML model for the multi-layer crop segmentation.

The soil-based segmentation is performed by the soil-based segmentation layer, on each the plurality filtered current season images identifying a plurality soil-based field edges, based on segmentation of bands and indices associated with the coarse resolution satellite data, to generate a plurality of soil-based segmented images. This soil-based segmentation process utilizes the Sentinel-2 image of bare soil before the start of the season, wherein segmentation has been carried out to separate out the areas based on soil difference. Data from Sentinel-2 and Landsat-8 such as Blue band, or index like Soil Adjusted Vegetation Index (SAVI) derived from Sentinel-2 bands is used, and field edges are identified based on the segmentation of bands and indices.

Algorithm 1: Soil-Based Segmentation $SEG_{Soil}$=f(B, SAVI): output from the soil-based segmentation layer The crop-wise segmentation is carried out by the crop-based segmentation layer on a first set of images identified from the plurality of filtered current season images corresponding to a crop growing season. Here, data from Sentinel-1 and Sentinel-2 is used and the analysis is carried out during the crop growing season. Using the Sentinel-1 data, a coherence between any two consecutive images is estimated and a temporal stack of coherence images is prepared. In addition to this, the Normalized Difference Vegetation Index (NDVI) is derived from each available Sentinel-2 image during the crop growing season and temporal stack of NDVI is prepared. Further at each time instance, with the available stack of coherence and NDVI, image segmentation was carried out to generate the crop-wise separation layer.

Algorithm 2: Crop-Wise Segmentation $SEG_{Crop}$=f($Coh_{t1}$, $Coh_{t2}$ ... $Coh_{tm}$, $NDVI_{t1}$, $NDVI_{t2}$, ... $NDVI_{tm}$)

$SEG_{Croptn}$=Output from Crop-wise segmentation at time instance tn $Coh_{t1}, Coh_{t2} \ldots Coh_{tn}$=Coherence estimated between two consecutive S1 images at various time instance t1, t2, ... tn $NDVI_{t1}, NDVI_{t2}, \ldots NDVI_{tn}$=NDVI estimated from Sentinel-2 images at various time instance t1, t2, ... tn Steps of the crop wise segmentation, which is performed using the CNN based ML model, comprising:
  a) Estimating a coherence between consecutive images in the first set of images to generate a temporal stack of coherence images;
  b) Deriving the Normalized Difference Vegetation Index (NDVI), during crop growing season from the first set of images to generate a temporal stack of NDVI;
  c) Performing crop-wise segmentation of the set of images using the temporal stack of coherence images and the temporal stack of NDVI, to generate crop-wise segmented image.

Further, the within-crop segmentation is carried out on the plurality of filtered previous seasons images via the CNN based ML model. Data for individual time instance across multiple years (for example, previous 5-6 years) is considered. First, crop is identified for all the pixels across all the years. For any pixels, years for which the crop was same is only considered in the analysis. For all such pixels the NDVI has been estimated using Sentinel-2 data. Further, median NDVI is estimated based on the historical years data and has been compared with current year NDVI for that time instance. This way change has been estimated for all the time instances and temporal stack of change layer has been generated. Further segmentation is carried out on that temporal stack of change layer.

Algorithm 3: Within Crop Segmentation $SEG_{WithinCroptn}$=f($NDVIC_{t1}$, $NDVIC_{t2}$, ... $NDVIC_{tn}$, $NDVIH_{t1}$, $NDVIH_{t2}$, ... $NDVIH_{tn}$)

$SEG_{WithinCroptn}$=Output from Within Crop segmentation at time instance tn $NDVIC_{t1}, NDVIC_{t2}, \ldots NDVIC_{tn}$=NDVI estimated from Sentinel-2 images at various time instance t1, t2, ... tn for the current season $NDVIH_{t1}, NDVIH_{t2}, \ldots NDVIH_{tn}$=Median NDVI estimated from Sentinel-2 images at various time instance t1, t2, ... tn based on data from 5-6 past seasons Steps of the within-crop segmentation, performed by the within crop segmentation layer, comprise:
  a) Identifying one or more crops corresponding to each pixel of the plurality of filtered previous seasons images to generate pixel level crop information,
  b) Identifying a second set of images from among the plurality of filtered previous seasons images using pixel level crop information, wherein a crop across the second set of images is similar, and
  c) Estimating, a median NDVI for the filtered previous seasons images, and comparing with the NDVI associated with first set of images at same time slots across in a crop season, to generate a temporal stack of change layer is generated, where further the segmentation is carried out on the temporal stack of change layer to generate within-crop segmented images.

Once the multi-layer crop segmentation is performed it enables extraction information of the RoI in context of field boundaries across crops, across seasons providing intra and inter field parameters derived from satellite data with help of spectral, spatial, and sematic information obtained from the segmentation layers. The output of all segmentation layers provides is an intermediate raster output. Then at step 208, the one or more hardware processors 104 detect the field boundaries of the agricultural area within the RoI by combining the soil based segmented images, the crop-wise segmented images, and the within-crop segmented images. Segmented output from all the three layers viz, soil-based segmentation, crop-wise segmentation and within-crop segmentation is combined together, and generated layer provides the field boundary layer using known techniques in the art. This field boundary layer is generated at every time instance when Sentinel-1 and Sentinel-2 images are available and is updated during the growing season.

Algorithm 4: Combining Individual Segmentation Outputs
  FieldBound=f(SEGSoil, SEGCroptn, SEGWithinCroptn)
  FieldBound=Detected field boundary layer Thereafter, at step 210, the one or more hardware processors 104 refine the field boundaries in the intermediate raster output or output edge raster images using a plurality of Geographic Information System (GIS) topology operations. This is performed in three steps a) field boundary raster to vector conversion, b) removal of sliver polygon, undershoot/overshoot error removal, and c) precise delineation of field boundary.

Algorithm 5: Refining Using GIS Topology Operations
  (a) field boundary raster to vector conversion
  FieldBoundVect=polygonize(FieldBound)
  Here, FieldBoundVect—is the vector field boundary layer
  polygonize—is the operation to convert the raster into vector layer
  FieldBound—is the raster output field boundary layer
  (b) Removal of sliver polygon, undershoot/overshoot error removal
  Sliver polygons=f(Area)
  Wherein, Area—Remove polygons with area smaller than 400 sq. m (threshold selected based on spatial resolution of satellite data)
  Overshoot=f(Edge length after node)
  Wherein, Edge length after node—identification of all edges having length 2 meter after node (i.e., intersection with line).
  Undershoot=f(Edge length before node)
  Wherein, Edge length before node—identification of all edges having length shorter than 2 meter before nearest node (i.e., intersection with line).
  (c) Precisely delineation of Field boundary
  FieldBoundFinal=f(FieldBound, FieldBoundVect, Sliver polygons, Overshoot, Undershoot)
  Wherein, FieldBoundFinal—Final delineated field boundary vector layer
  FieldBound—is the raster output field boundary layer
  FieldBoundVect—is the vector field boundary layer
  Sliver Polygons—are the unwanted small polygons resulting from layer intersection, algorithm error, etc.
  Overshoot—are the excess portion of edge remaining after completing a polygon.
  Undershoot—are the edges falling short to complete a polygon.

Once the field boundaries are refined, at step 212, the one or more hardware processors 104 update a plurality of baseline cadastral maps using information from maps generated using the refined field boundaries identified in real time for each season. The change between baseline cadastral maps and every year's real time field boundary map generated by method disclosed are compared. If the changes identified during the comparison of the images of ROI after 1 year are persistent for continuous predefined number of years (for example, 3-4 years as identified by a domain expert), then that change is appended, and the cadastral map is updated accordingly. This way baseline cadastral maps are continuously updated.

Algorithm 6: Updating Cadastral Maps:
CadastralUP=f(CadastralBase, FieldBoundFinal$_{y1}$, FieldBoundFinal$_{y2}$, FieldBoundFinal$_{y3}$)
CadastralUP=Updated cadastral map layer
CadastralBase=Baseline digitized cadastral layer
FieldBoundFinal$_{y1}$=Detected Field boundary layer for year 1
FieldBoundFinal$_{y2}$=Detected Field boundary layer for year 2
FieldBoundFinal$_{y3}$=Detected Field boundary layer for year 3

Thus, the method and system disclosed herein utilizes Machine Learning (ML) based image processing and GIS based approach to detect the field boundaries. The method can help delineate the plot boundaries without visiting the fields and with very minimal cost. System can be used for any future scenarios of split and merge i. e., even when the field boundaries are split in parts or merged. The system provides generalized approach for field boundary detection of any RoI, and the ML model trained need not be customized for RoI. This improves easy application of the system, enhancing utility and time efficient usage of the system. The system can quickly scale to large area thereby covering large number of fields. Data on digital field boundary can be used by various stakeholders in agriculture, for example banks and insurance companies can use the data to precisely measure the field area.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for detection of field boundaries, the method comprising:
receiving, for a Region of Interest (RoI), a coarse resolution satellite data captured at a plurality of time stamps, via one or more hardware processors, the coarse resolution satellite data comprising: (i) a plurality of current season images, and (ii) a plurality of previous seasons images collected for a predefined number of previous seasons;
masking, via the one or more hardware processors, each of the plurality of current season images and each of the plurality of previous seasons images using an agriculture versus non-agriculture layer data to generate a plurality of filtered current season images and a plurality of filtered previous seasons images, wherein a pixel information in each image is restricted to an agricultural area of the RoI;

performing, via the one or more hardware processors, a multi-layer crop segmentation selectively on the plurality filtered current season images and the plurality of filtered previous seasons images, the multi-layer crop segmentation comprising (a) a soil-based segmentation capturing spectral features of the RoI, wherein data from sentinel-2 of bare soil is used, (b) a crop-wise segmentation capturing spatial features of the RoI in context of field boundary detection, wherein data from sentinel-1 and sentinel-2 is used and (c) a within-crop segmentation capturing semantic information of the RoI, in context of semantic segmentation, wherein
  (i) the soil-based segmentation is performed on each of the plurality filtered of current season images identifying a plurality of soil-based field edges, based on segmentation of bands and indices associated with the coarse resolution satellite data, to generate a plurality of soil-based segmented images;
  (ii) the crop-wise segmentation is performed on a first set of images identified from the plurality of filtered current season images corresponding to a crop growing season, wherein the crop-wise segmentation comprising:
    estimating a coherence between consecutive images in the first set of images to generate a temporal stack of coherence images;
    deriving a Normalized Difference Vegetation Index (NDVI), during crop growing season from the first set of images to generate a temporal stack of NDVI; and
    performing crop-wise segmentation of the set of images using the temporal stack of coherence images and the temporal stack of NDVI, to generate crop-wise segmented images; and
  (iii) the within-crop segmentation is performed on the plurality of filtered previous seasons images, the within-crop segmentation comprising:
    identifying one or more crops corresponding to each pixel of the plurality of filtered previous seasons images to generate a pixel level crop information;
    identifying a second set of images from among the plurality of filtered previous seasons images using pixel level crop information, wherein a crop across the second set of images is similar; and
    estimating, a median NDVI for the filtered previous seasons images, and comparing with the NDVI associated with first set of images at same time slots across in a crop season, to generate a temporal stack of change layer, where further the segmentation is carried out on the temporal stack of change layer to generate within-crop segmented images; and
detecting, via the one or more hardware processors, the field boundaries of the agricultural area within the RoI by combining the soil-based segmented images, the crop-wise segmented images, and the within-crop segmented images, wherein the field boundaries are generated at every time instance when the Sentinel-1 and Sentinel-2 images are available and are updated during growing season,
refining the field boundaries using a plurality of Geographic Information System (GIS) topology operations, wherein refining the field boundaries includes steps of a) a field boundary raster to vector conversion, b) removal of sliver polygon, undershoot/overshoot error removal, and c) precise delineation of field boundary,
  wherein (a) the field boundary raster to vector conversion is represented as FieldBoundVect=polygonize (FieldBound), wherein FieldBoundVect is a vector field boundary layer, polygonise is an operation to convert the raster into vector layer, FieldBound is a raster output field boundary layer,
  wherein (b) sliver polygons is function of area to remove polygons with area smaller than a pre-defined threshold based on a spatial resolution of satellite data, wherein overshoot is a function of edge length after node, wherein the edge length after node is identification of all edges having a pre-defined length after node, wherein undershoot is a function of edge length before node, wherein the edge length before node is identification of all edges having a length shorter a pre-defined length than before nearest node,
  wherein (c) precisely delineation of field boundary is represented as a FieldBoundFinal, wherein the FieldBoundFinal is function of a FieldBound, a FieldBoundVect, a sliver polygons, an overshoot, and an undershoot, wherein the FieldBoundFinal is a Final delineated field boundary vector layer, the FieldBound is a raster output field boundary layer, the FieldBoundVect is a vector field boundary layer, the sliver polygons are the unwanted small polygons resulting from layer intersection, algorithm error, the overshoot are the excess portion of edge remaining after completing a polygon, and undershoot are the edges falling short to complete the polygon.

2. The method of claim 1, further comprising updating a plurality of baseline cadastral maps using information from maps generated using the refined field boundaries identified in real time for each season.

3. A system for detection of field boundaries, the system comprising:
  a memory storing instructions;
  one or more Input/Output (I/O) interfaces; and
  one or more hardware processors coupled to the memory via the one or more I/O interfaces, wherein the one or more hardware processors are configured by the instructions to:
    receive for a Region of Interest (RoI), a coarse resolution satellite data captured at a plurality of time stamps the coarse resolution satellite data comprising: (i) a plurality of current season images, and (ii) a plurality of previous seasons images collected for a predefined number of previous seasons;
    mask, each of the plurality of current season images and each of the plurality of previous seasons images using an agriculture versus non-agriculture layer data to generate a plurality of filtered current season images and a plurality of filtered previous seasons images, wherein a pixel information in each image is restricted to an agricultural area of the RoI;
    perform a multi-layer crop segmentation selectively on the plurality filtered current season images and the plurality of filtered previous seasons images, the multi-layer crop segmentation comprising (a) a soil-based segmentation capturing spectral features of the RoI, wherein data from sentinel-2 of bare soil is used, (b) a crop-wise segmentation capturing spatial features of the RoI in context of field boundary detection, wherein data from sentinel-1 and sentinel-2 is used and (c) a within-crop segmentation capturing semantic information of the RoI, in context of semantic segmentation, wherein (i) the soil-based segmentation is performed on each of the plurality filtered of current season images identifying a plurality of soil-based field edges, based on segmentation of bands and indices associated with the coarse resolution satellite data, to generate a plurality of soil-based segmented images;

(ii) the crop-wise segmentation is performed on a first set of images identified from the plurality of filtered current season images corresponding to a crop growing season, wherein the crop-wise segmentation comprising:

estimating a coherence between consecutive images in the first set of images to generate a temporal stack of coherence images;

deriving a Normalized Difference Vegetation Index (NDVI), during crop growing season from the first set of images to generate a temporal stack of NDVI; and performing crop-wise segmentation of the set of images using the temporal stack of coherence images and the temporal stack of NDVI, to generate crop-wise segmented images; and (iii) the within-crop segmentation is performed on the plurality of filtered previous seasons images, the within-crop segmentation comprising:

identifying one or more crops corresponding to each pixel of the plurality of filtered previous seasons images to generate a pixel level crop information;

identifying a second set of images from among the plurality of filtered previous seasons images using pixel level crop information, wherein a crop across the second set of images is similar; and estimating, a median NDVI for the filtered previous seasons images, and comparing with the NDVI associated with first set of images at same time slots across in a crop season, to generate a temporal stack of change layer, where further the segmentation is carried out on the temporal stack of change layer to generate within-crop segmented images;

detect the field boundaries of the agricultural area within the RoI by combining the soil-based segmented images, the crop-wise segmented images, and the within-crop segmented images, wherein the field boundaries are generated at every time instance when the Sentinel-1 and Sentinel-2 images are available and are updated during growing season;

refine the field boundaries using a plurality of Geographic Information System (GIS) topology operations, wherein refining the field boundaries includes steps of a) a field boundary raster to vector conversion, b) removal of sliver polygon, undershoot/overshoot error removal, and c) precise delineation of field boundary, wherein (a) the field boundary raster to vector conversion is represented as FieldBoundVect= polygonize (FieldBound), wherein FieldBoundVect is a vector field boundary layer, polygonise is an operation to convert the raster into vector layer, FieldBound is a raster output field boundary layer, wherein (b) sliver polygons is function of area to remove polygons with area smaller than a pre-defined threshold based on a spatial resolution of satellite data, wherein overshoot is a function of edge length after node, wherein the edge length after node is identification of all edges having a pre-defined length after node, wherein undershoot is a function of edge length before node, wherein the edge length before node is identification of all edges having a length shorter a pre-defined length than before nearest node, wherein (c) precisely delineation of field boundary is represented as a FieldBoundFinal, wherein the FieldBoundFinal is function of a FieldBound, a FieldBoundVect, a sliver polygons, an overshoot, and an undershoot, wherein the FieldBoundFinal is a Final delineated field boundary vector layer, the FieldBound is a raster output field boundary layer, the FieldBoundVect is a vector field boundary layer, the sliver polygons are the unwanted small polygons resulting from layer intersection, algorithm error, the overshoot are the excess portion of edge remaining after completing a polygon, and undershoot are the edges falling short to complete the polygon.

4. The system of claim 3, wherein the one or more hardware processors are further configured to update a plurality of baseline cadastral maps using information from maps generated using the refined field boundaries identified in real time for each season.

5. One or more non-transitory machine-readable information storage mediums comprising one or more instructions which when executed by one or more hardware processors cause:

receiving for a Region of Interest (RoI), a coarse resolution satellite data captured at a plurality of time stamps, the coarse resolution satellite data comprising: (i) a plurality of current season images, and (ii) a plurality of previous seasons images collected for a predefined number of previous seasons;

masking each of the plurality of current season images and each of the plurality of previous seasons images using an agriculture versus non-agriculture layer data to generate a plurality of filtered current season images and a plurality of filtered previous seasons images, wherein a pixel information in each image is restricted to an agricultural area of the RoI;

performing a multi-layer crop segmentation selectively on the plurality filtered current season images and the plurality of filtered previous seasons images, the multi-layer crop segmentation comprising (a) a soil-based segmentation capturing spectral features of the RoI, wherein data from sentinel-2 of bare soil is used, (b) a crop-wise segmentation capturing spatial features of the RoI in context of field boundary detection, wherein data from sentinel-1 and sentinel-2 is used and (c) a within-crop segmentation capturing semantic information of the RoI, in context of semantic segmentation, wherein (i) the soil-based segmentation is performed on each of the plurality of filtered current season images identifying a plurality of soil-based field edges, based on segmentation of bands and indices associated with the coarse resolution satellite data, to generate a plurality of soil-based segmented images;

(ii) the crop-wise segmentation is performed on a first set of images identified from the plurality of filtered current season images corresponding to a crop growing season, wherein the crop-wise segmentation comprising:

estimating a coherence between consecutive images in the first set of images to generate a temporal stack of coherence images;

deriving a Normalized Difference Vegetation Index (NDVI), during crop growing season from the first set of images to generate a temporal stack of NDVI; and performing crop-wise segmentation of the set of images using the temporal stack of coherence images and the temporal stack of NDVI, to generate crop-wise segmented images; and (iii) the within-crop segmentation is performed on the plurality of filtered previous seasons images, the within-crop segmentation comprising:

identifying one or more crops corresponding to each pixel of the plurality of filtered previous seasons images to generate a pixel level crop information;

identifying a second set of images from among the plurality of filtered previous seasons images using pixel level crop information, wherein a crop across the second set of images is similar; and estimating, a median NDVI for the filtered previous seasons images, and comparing with the NDVI associated with first set of images at same time slots across in a crop season, to generate a temporal stack of change layer, where further the segmentation is carried out on the temporal stack of change layer to generate within-crop segmented images;

detecting the field boundaries of the agricultural area within the RoI by combining the soil-based segmented images, the crop-wise segmented images, and the within-crop segmented images, wherein the field boundaries are generated at every time instance when the Sentinel-1 and Sentinel-2 images are available and are updated during growing season;

refining the field boundaries using a plurality of Geographic Information System (GIS) topology operations, wherein refining the field boundaries includes steps of a) a field boundary raster to vector conversion, b) removal of sliver polygon, undershoot/overshoot error removal, and c) precise delineation of field boundary, wherein (a) the field boundary raster to vector conversion is represented as FieldBoundVect-polygonize (FieldBound), wherein FieldBoundVect is a vector field boundary layer, polygonise is an operation to convert the raster into vector layer, FieldBound is a raster output field boundary layer, wherein (b) sliver polygons is function of area to remove polygons with area smaller than a pre-defined threshold based on a spatial resolution of satellite data, wherein overshoot is a function of edge length after node, wherein the edge length after node is identification of all edges having a pre-defined length after node, wherein undershoot is a function of edge length before node, wherein the edge length before node is identification of all edges having a length shorter a pre-defined length than before nearest node, wherein (c) precisely delineation of field boundary is represented as a FieldBoundFinal, wherein the FieldBoundFinal is function of a FieldBound, a FieldBoundVect, a sliver polygons, an overshoot, and an undershoot, wherein the FieldBoundFinal is a Final delineated field boundary vector layer, the FieldBound is a raster output field boundary layer, the FieldBoundVect is a vector field boundary layer, the sliver polygons are the unwanted small polygons resulting from layer intersection, algorithm error, the overshoot are the excess portion of edge remaining after completing a polygon, and undershoot are the edges falling short to complete the polygon.

6. The one or more non-transitory machine-readable information storage mediums of claim 5, further cause updating a plurality of baseline cadastral maps using information from maps generated using the refined field boundaries identified in real time for each season.

* * * * *